Sept. 13, 1938.                    H. E. TWOMLEY                    2,129,974
                                BOX LIDDING MACHINE
                             Filed Aug. 10, 1934            9 Sheets-Sheet 1

Inventor
Herbert E. Twomley
By Lyon & Lyon
Attorney

Sept. 13, 1938.  H. E. TWOMLEY  2,129,974
BOX LIDDING MACHINE
Filed Aug. 10, 1934  9 Sheets-Sheet 6

Inventor
Herbert E. Twomley
By Lyon & Lyon
Attorney

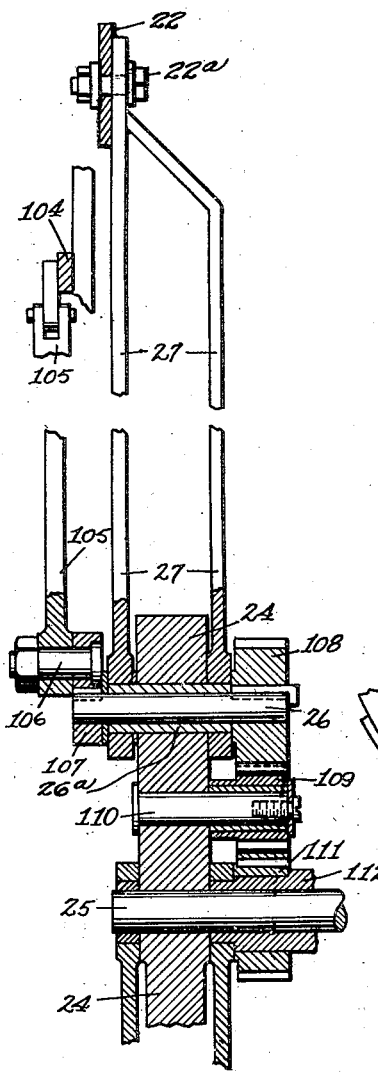
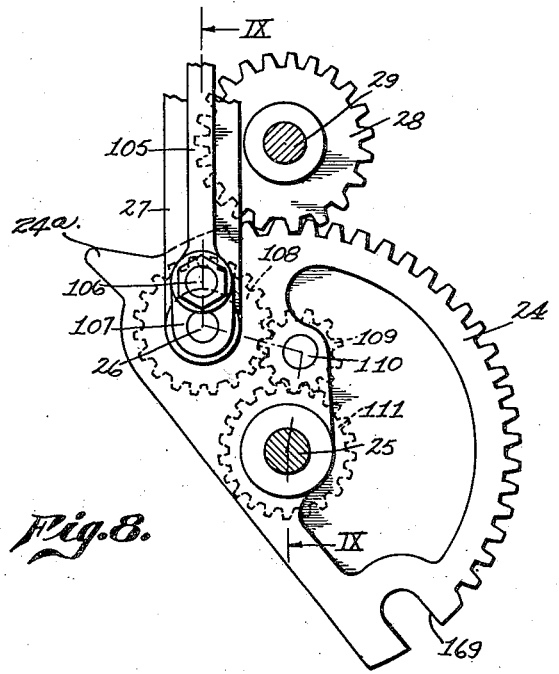
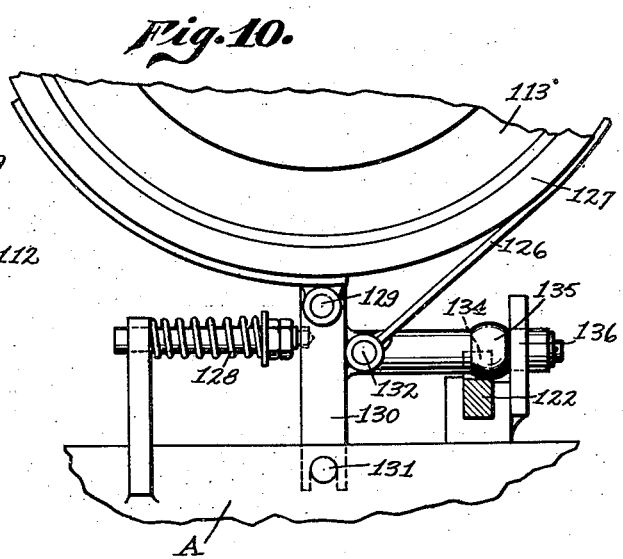

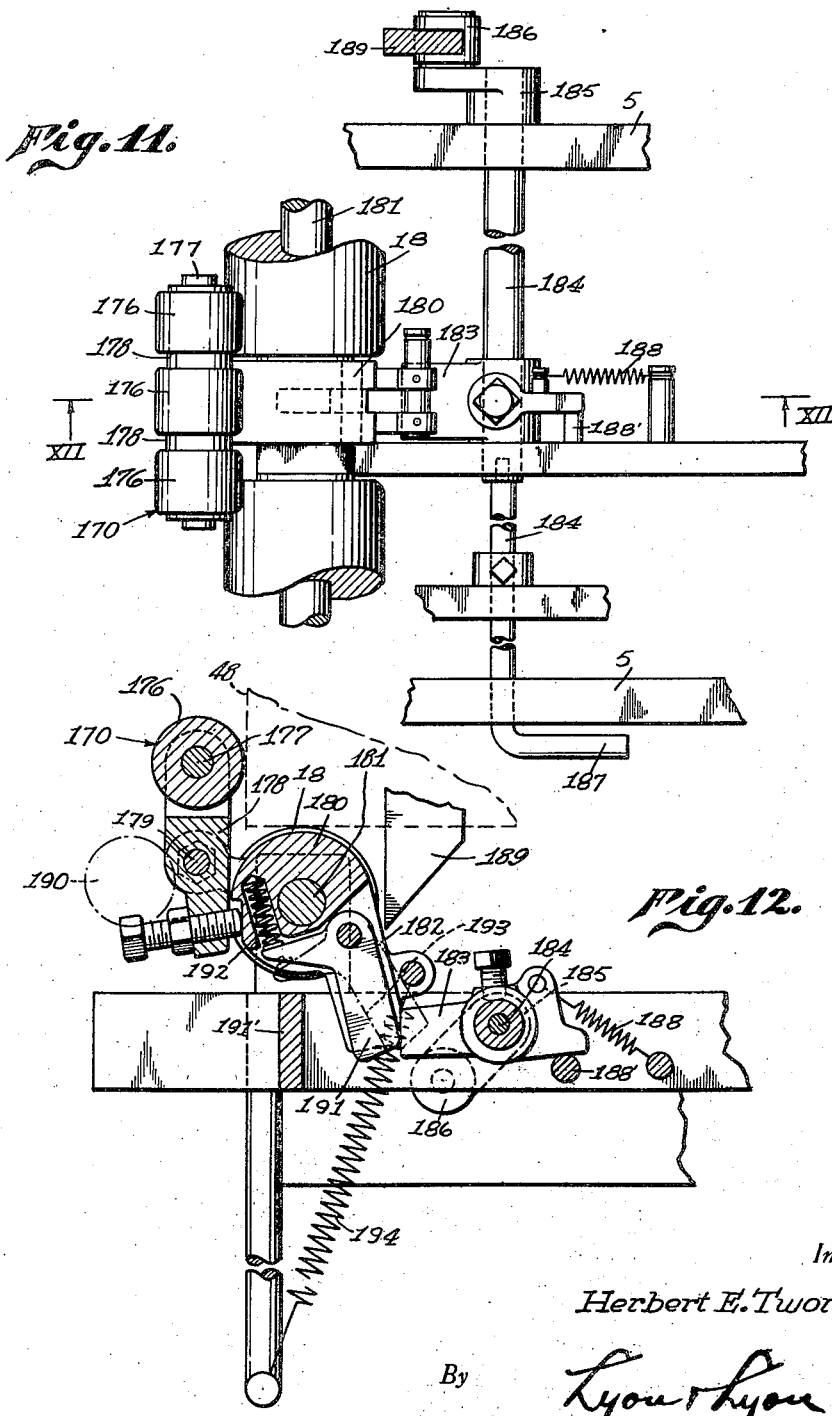

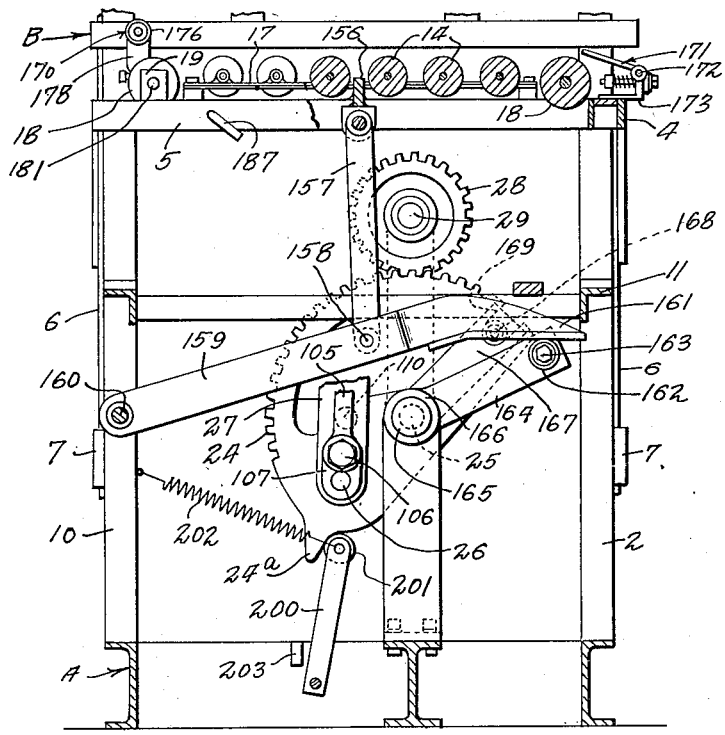

Patented Sept. 13, 1938

2,129,974

UNITED STATES PATENT OFFICE 2,129,974

BOX LIDDING MACHINE

Herbert E. Twomley, Riverside, Calif., assignor, by mesne assignments, to Food Machinery Corporation, a corporation of Delaware Application August 10, 1934, Serial No. 739,276

23 Claims. (Cl. 1—10)

My invention relates to box lidding machines, and has particular reference to a machine for applying lids to boxes, crates and similar containers employed for the packaging of vegetables, fruits and the like.

In the vegetable and fruit packing industry it is common practice to employ a crate or box formed of relatively thin strips of wood, which crates are formed with their ends, sides and bottom in place, after which they are filled with the fruits or vegetables to be contained therein, usually to a point considerably above the upper limits of the box, so that it is necessary to apply considerable pressure to the top of the contents of the box to press the same down into the boundaries of the box when a lid or cover is to be applied thereto.

The desirability of such over-packing of the vegetables or fruits is to compensate for the usual loss of moisture during transportation and storage of the vegetables and fruits so that the cover when applied to the box will exert a pressure upon the contents tending to follow up the shrinkage of the contents thereby maintaining the packed contents in tight relation within the box.

Various types of machines have been suggested for the purpose of automatically applying covers to boxes of this character, but one of the primary difficulties involved in the operation of such machines is that of insuring the tucking in of the over-packed contents to insure against crushing, pinching and otherwise damaging of the contents during the time they are pressed down into the box while the lid is being applied. A further difficulty which is encountered in such automatic operations is that the boxes which are used vary considerably in size and it is necessary to adapt such machines to take several different sized boxes and properly lid these boxes without accurate readjustments of the machines.

It is, therefore, an object of my invention to provide a lidding machine for vegetable boxes, and the like, which is adapted to readily gather the overflowing or over-packed contents and press the same within the boundaries of the box prior to application of final pressure to the lid of the box.

Another object of the invention is to provide a machine for applying lids to fruit and vegetable boxes in which an operator may control the power applied for pressing the cover into place and may then separately control automatic nailing mechanisms which will secure the cover to the box.

Another object of my invention is to provide a machine of the character set forth in which a number of different sized boxes may be employed in the machines and may have the covers attached thereto without complicated readjustments on the machine for the different size boxes.

Another object of my invention is to provide a machine for applying lids to fruit boxes, which includes a pressing mechanism for pressing a cover down upon a box and a nailing mechanism for nailing the covers so pressed to the boxes, in which the nailing mechanism and pressing mechanism are reciprocably mounted for movement toward and away from a box, the nailing mechanism moving in synchronism with the pressing mechanism until the pressing operations are complete and then moving independently of the pressing mechanism to accomplish the nailing operations.

Another object of my invention is to provide a box nailing mechanism in which the nail punches and the nail chucks are independently mounted for reciprocation and in which the driving mechanism for the nail punches is carried by mechanism which moves the nail chucks to varying levels whereby nails may be driven a predetermined distance through the chucks independent of the position of the chucks.

Other objects and advantages will be apparent from a study of the following specifications, read in connection with the accompanying drawings, wherein:

Fig. 4a is a detail view similar to Fig. 4 illustrating the position of the tucking mechanisms during the earlier stages of the lid pressing operations of my machine;

Fig. 4b is a detail view similar to Fig. 4 illustrating the position of the tucking mechanisms at the final pressing operations of the machine, with the cover in position for nailing;

Fig. 8 is a detail view of the driving mechanism employed for simultaneously moving the nail driving head and the pressing head to the desired nailing level and then for independently operating the nail driving mechanism to drive the nails at such level.

Fig. 9 is a sectional view of the driving mechanism shown in Fig. 8, taken along the line IX—IX of Fig. 8;

Fig. 10 is a detail view of a secondary brake and brake-control mechanism which may be employed with my invention;

Fig. 11 is a detail plan view of a box stopping mechanism which may be employed on the machine shown in Fig. 1; and Fig. 12 is a detail sectional view taken along line XII—XII of Fig. 11.

Fig. 12a is a detail sectional view similar to Fig. 12, but showing the parts in a different position of operation.

Fig. 13 is a skeleton front elevational view with some of the parts deleted and others shown in section to illustrate the mechanism for raising and lowering the nailing table of my device.

Figure 1:
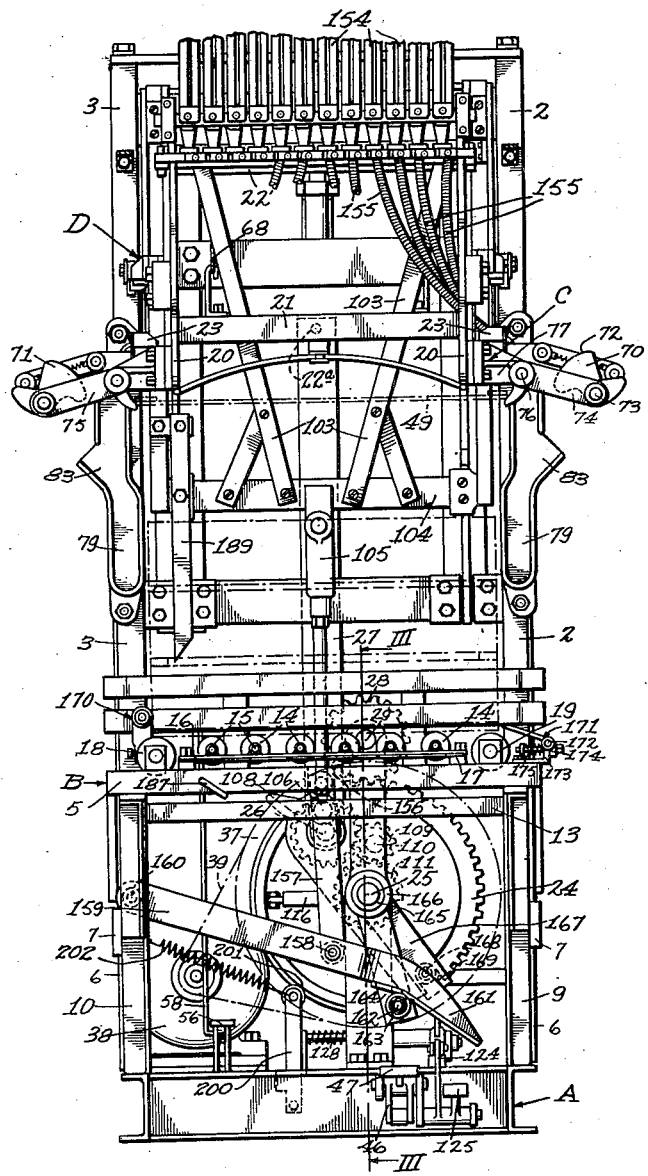
Figure 1 is a front elevational view of a machine constructed in accordance with my invention.

Referring to the drawings, I have illustrated my box lidding machine as comprising substantially a rectangular base A upon which is mounted a nailing table B which constitutes a supporting device for holding a box in place in the machine during the pressing and nailing operations which are performed upon the lid placed upon the box.

Extending from the base A is a pair of uprights 2 and 3 constituting slide bearings, upon which a pressframe C is slidably mounted, and also constituting a slide bearing upon which a nailing head D is slidably mounted both for movement in a vertical direction toward and away from the nailing table B so that when a box is in place upon the nailing table B the pressframe C may be drawn downwardly toward the box to engage and press a cover down upon the box and thereafter the nailing head D may be drawn down toward the box to drive the nails through the ends of the cover after they have been pressed into contact with the ends of the box.

The nailing table B is preferably formed of a substantially rectangular frame formed of side bars 4 and front and rear bars 5. The rearward ends of the side bars 4 are rigidly secured to vertically extending shafts 6 mounted for sliding movement in a vertical direction in a pair of bearing members 7 and 8 which are in turn rigidly secured to the outer side surfaces of the uprights 2 and 3 so that the nailing table may be moved upwardly and downwardly relative to the base of the machine to adjust the machine for applying lids to boxes of varying depth, as will be hereinafter more fully described.

Figure 2:
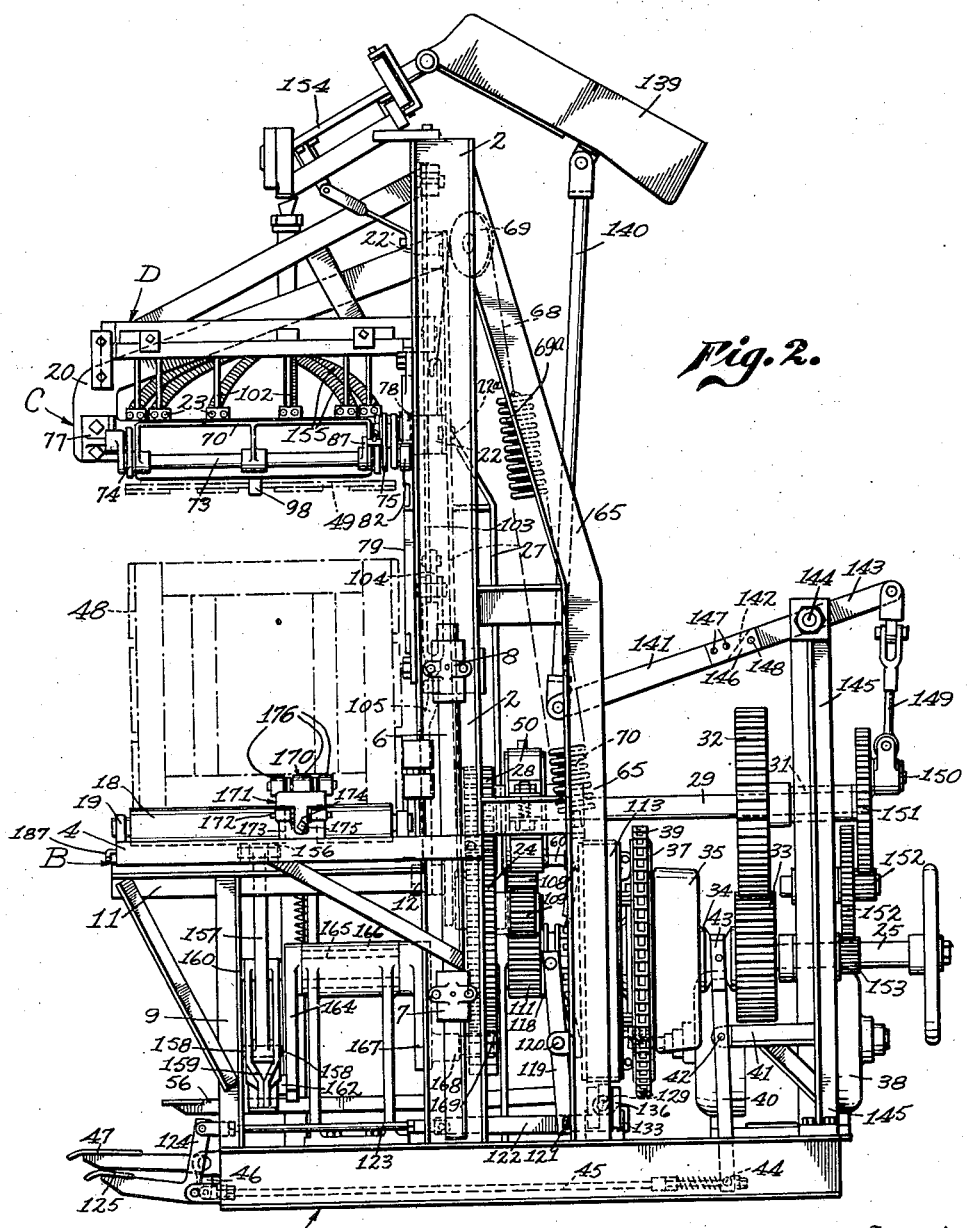
Fig. 2 is a side elevational view of the machine shown in Fig. 1.

With the nailing table B in its normal lowermost position, as shown in Figs. 1 and 2, the nailing table rests upon a pair of end frames 9 and 10, each of which is illustrated as comprising a short upright extending from the base B and connected to a cross bar 11, one end of which is secured as at 12 to the main upright 2 (or 3) of the machine. The end frames 9 and 10 may be suitably braced by a laterally extending brace 13 interconnecting the frames at opposite sides of the machine.

The nailing table B is preferably formed as a simple section of roller conveyor to facilitate the entry thereupon, and the exit therefrom, of boxes to be lidded, and I have illustrated the same as including a plurality of rollers 14 (Fig. 1) extending forwardly and rearwardly of the machine, each of the rollers being suitably mounted in bearing members 15 assembled upon a spring support 16 extending laterally of the machine. The spring support 16 is preferably secured to the frame of the nailing table B upon spacers 17 so that the entire assembly of rollers 14 and spring support 16 constitutes a supporting surface for boxes which may yield under the pressure applied to the cover of the box. This is an important feature in the packaging of certain types of vegetables and fruits, wherein it is desired that a part of the overpack shall bulge not only at the top of the box but also at the bottom of the box, and thus though the rollers 14 at the opposite ends of the spring support 16 are confined to a relatively small movement, the center rollers are permitted further movement, thus properly distributing the bulge of the overpack throughout the bottom of the box. To constitute a relatively rigid support or anvil against which the ends of the boxes may rest when the nailing pressure is applied thereto, I provide upon the nailing table B at extreme ends thereof, rollers 18 which are not spring mounted but which are secured in rigid bearing members 19 secured directly to the frame of the nailing table B. Thus these rollers 18, which will lie directly under the end frames of the box, will not be permitted any movement under the pressure exerted by the pressing and nailing mechanisms, and will constitute a non-yielding support to withstand the nailing and pressing pressures.

The preferred method of applying lids to boxes is to hold the box stationary and to move the pressframe mechanism C downwardly toward the box to engage the ends of the cover placed over the box, to spring the ends of the cover down upon the box, and to hold them in this relation with the ends of the cover contacting the ends of the box while the nails are driven through the cover ends and into the box ends. For this purpose I have illustrated the pressframe C as comprising a pair of forwardly extending brackets 20, one on each side of the machine, the brackets 20 being interconnected at their forward ends by means of a cross brace 21 and at their rearward ends by means of flat plates 22 and 22'. The lower sides of the brackets 20 have rigidly secured thereto a plurality of nail chucks 23, six of which are illustrated herein for each of the brackets 20, so that when the pressframe C is moved downwardly toward a box it will engage and press the cover into contact with the box and place the lower ends of the nail chucks into direct contact with the upper surfaces of the cover ends ready for the driving of the nails when the nailing head D is then operated.

The pressframe C is arranged to be moved toward and away from the nailing table B by means of a sector gear 24 journaled upon a bearing shaft 25 and rotatable thereon. The sector gear 24 (Figs. 2, 8, 9, and 13) is provided with a sleeve 26a spaced a considerable distance from the shaft 25 and connected by means of a pair of connecting rods 27 to a pivot pin or bolt 22a on the cross bar 22 interconnecting the pressframe brackets 20 so that when the sector gear 24 is rotated about the shaft 25 the connecting rods 27 will be drawn downwardly and will carry the pressframe downwardly toward the box. Springs 69a are employed to lift the pressframe C back to its normal position, as shown in Figs. 1 and 2, rotating the sector gear in the reverse direction. The sector gear 24 is arranged to be driven through the medium of a pinion 28 (Fig. 3) rigidly connected to a shaft 29 which extends rearwardly of the machine and is journaled in bearing members 30 and 31, the shaft 29 having rigidly secured thereto a gear 32 which meshes with a pinion 33 rigidly secured to a hub 34 forming an extension of a cone clutch 35 engageable with a cone 36 secured to or forming an integral part of a sprocket 37. The hub 34 of the cone clutch 35 is illustrated as being mounted for convenience upon the shaft 25 upon which it is freely rotatable.

The sprocket 37 is illustrated as being constantly driven by means of an electric motor 38 (Fig. 1) which may be connected through a suitable chain 39 to the sprocket 37.

By referring particularly to Fig. 2, it will be observed that the cone clutch 35 is arranged to be moved forwardly and rearwardly of the machine and to connect with and disconnect from the cone 36 by means of a lever 40 pivoted upon a bracket 41, as indicated at 42, the upper end of the lever 40 being connected to a yoke 43 operating in a grooved portion of the hub 34. The lower end of the lever 40 is connected as at 44 with a rod 45 extending forwardly of the machine to connect with a bellcrank 46 bearing upon one of its arms a forwardly extending foot pedal 47. It will therefore be apparent that an operator of the machine, having placed a box 48 on the nailing table B and having placed a cover 49 thereabove, may step upon the pedal 47 to move the rod 45 rearwardly and thus throw the cone clutch 35 into engagement with the constantly rotating cone 36. This operation will cause the cone clutch 35 to drive the shaft 29 through the gears 33 and 32, and thus through pinion 28 drive the sector gear to move the pressframe downwardly into pressing position upon the cover of the box.

As will be understood by those skilled in the art, the cone clutch may be suitably adjusted so that when the ends of the cover are pressed into contact with the ends of the box and the resistance to further movement of the sector gear is therefore increased, the clutch will slip to prevent further movement of the sector gear and thus prevent crushing of the box or damage to the machine.

It is desirable that at this stage of the operations of the machine that the operator may remove his foot from the pedal 47 without permitting retraction of the sector gear and the pressframe C, and for this purpose I have illustrated a brakedrum 50 (Figs. 3, 6, and 7) rigidly connected to the shaft 29 and rotatable therewith, surrounded by a brakeband 51.

Figure 6:
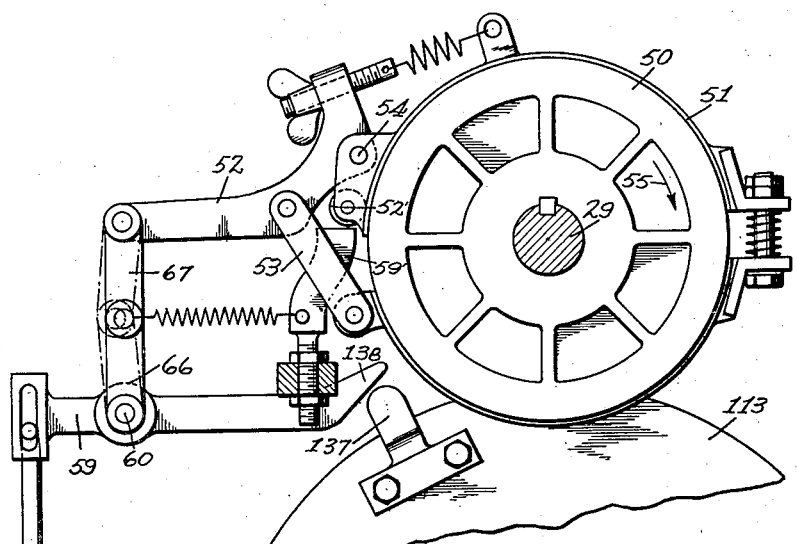
Fig. 6 is a detail view of a brake and brake-releasing mechanism which may be employed for controlling the machine shown in Figs. 1 and 2.
Figure 7:
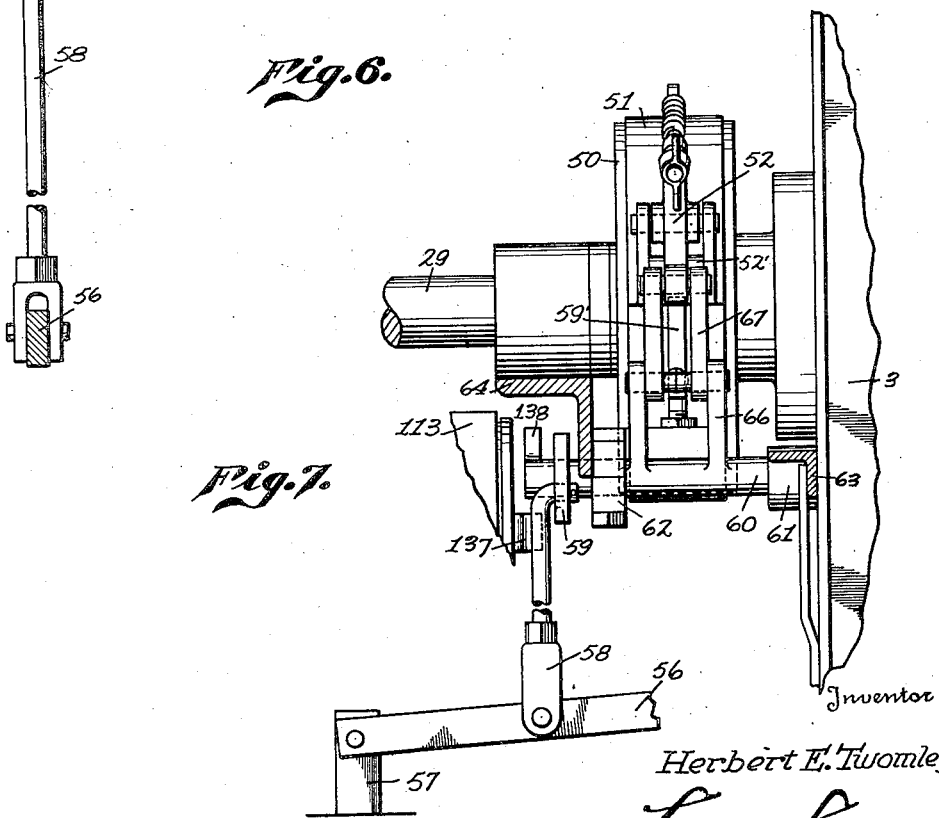
Fig. 7 is a side elevational view of the brake and brake-releasing mechanism shown in Fig. 6.

By referring particularly to Fig. 6 it will be observed that the brakeband 51 extends substantially around the entire surface of the brakedrum 50, the ends of the brakeband 51 being connected respectively to one end of a lever 52 which is pivotally supported at its opposite end, and to a link 53. The link 53 is illustrated as connected with the lever 52 at a point spaced from the point of connection 54 of the end of the brakeband 51 so that rotation of the brakedrum 50 in the direction indicated by arrow 55 thereon will automatically relieve pressure of the brakeband 51 on the drum and permit relatively free rotation of the shaft 29 but reverse rotation of the shaft 29 will be effectively prevented since the leverage of the connection of the brakeband 51 is such that reverse rotation will tighten the band upon the drum. Thus rotation of drum 50 in a clockwise direction lifts the free end of the upper half of the brakeband 51 and rotates the lever 52 in a counterclockwise direction about its left end as a pivot, whereas the upward movement of the free end of the lower half of the brakeband is less because of the fact that it is connected by link 53 to a point on lever 52 closer to the left end of the latter. The result of lifting the left end of the upper half of the brakeband a greater distance than the left end of the lower half is lifted is to loosen the band on the drum. On the other hand when it is attempted to rotate the drum 50 in a counterclockwise direction the band 51 also attempts to rotate with the drum in a counterclockwise direction thereby carrying the left end of the upper half of the brakeband downwardly a greater distance than the left end of the lower half of the brakeband is carried, thereby tightening the band about the drum and restraining rotation of the drum. Therefore when the pressframe has been moved downwardly, the brakeband 51 will engage the drum 50 and hold the sector gear and the pressframe C in the positions to which they have been moved, and it is necessary to operate other mechanism for releasing the brakeband 51 to permit re-elevation of the pressframe C.

It frequently occurs that during the movement of the pressframe C in accomplishing the pressing operations some of the overflow contents of the box may be in danger of being squeezed between the edges of the cover and the edges of the box and may require a redistribution of the contents of the box before the cover may properly be placed thereon. Also, it frequently occurs that the relatively thin boards of which the cover is formed may crack under the pressure exerted by the pressframe C, in which event it is necessary to remove that cover and substitute another therefor. To permit the movement of the pressframe C to be reversed in the event of any such occurrences, I provide a brake-releasing pedal 56 pivoted upon an upstanding lug 57 (see Fig. 7), secured to the base A and having a link 58 connecting the pedal 56 with a lever 59 mounted upon and forming a part of a shaft 60 mounted for oscillation in suitable bearing members 61 and 62.

The bearing member 61 is mounted on a bracket 63 secured to the inside surface of the upright 3, while bearing member 62 may be connected to an angle brace 64 interconnecting the bracing frame 65 employed for bracing the uprights 2 and 3. The shaft 60 has secured thereto an upstanding bracket 66 connected to a link 67 which is in turn connected to the outer end of the brakeband operating lever 52. Thus, depression of the brake pedal 56 will move the bracket 66 to the position shown in dotted lines in Figure 6, thus forming the link 67 a toggle connection which moves the outer end of the lever 52 downwardly, separating the lower half of the brakeband 51 from the drum 50. At the same time, elevation of the inner end 138 on lever 59 will cause a lug 59' to strike a roller 52' on the upper half of the brakeband 51 to insure the release of this half of the brakeband, thus permitting the drum 50 to rotate in a reverse direction and allow the pressframe C to be elevated to its normal position by the force of the springs 69a. The springs 69a are connected to the pressframe by mechanism next to be described.

By referring particularly to Fig. 2 it will be observed that the pressframe C is connected to two suitable chains or cables 68 passing over pulleys 69 and connected at their other ends respectively to the upper ends of the two springs 69a, the lower ends of the springs 69a being secured to any suitable stationary portion of the machine. The springs 69a, therefore, will constitute means urging the pressframe upwardly and will move the pressframe upwardly whenever the brakeband 51 is released from its drum 50 and the clutch elements 35 and 36 are disengaged.

It will be understood by those skilled in the art that it is the common practice to overpack containers of this type, as hereinbefore described, and as a result of such over-packing, excess material overflowing the upper edges of the container would be likely to be crushed or pinched between the upper edges of the container and the cover when the cover is pressed down thereon. To avoid unnecessary damaging of the contents of the box during the pressing action, I provide tucking mechanisms which are arranged to gather the overflow and press the same inwardly of the boundaries of the box or container during the time that the pressframe C is moving downwardly to press the cover upon the box.

The tucking mechanism which I employ for gathering the overflow at the ends of the boxes is particularly illustrated in Figs. 1, 4, 4a, 4b and 5 and includes a tucker 70 at the right-hand end of the machine and a similar tucker 71 on the left-hand side of the machine. The tucking mechanisms at opposite sides of the machine, being identical, will require a detailed description of only one of them. The tucker 70 at the right-hand side of the machine is illustrated as comprising an elongated casting having the general shape of a sector of a cylinder, the curved outer surface 72 of which may be presented to the overflowing contents of the container so as to press the contents inwardly of the box without cutting, scraping or otherwise injuring the fruit, vegetables or other materials which are to be packed.

The tucker 70 is illustrated as being pivoted upon a shaft 73 journaled in the outer ends of a pair of links 74 and 75. The inner ends of the links 74 and 75 are pivotally mounted upon a forwardly extending shaft 76 carried by a laterally extending bracket 77 mounted upon and movable with the pressframe C.

The link 75 is illustrated as extending inwardly of the shaft 76 and has upon its extreme inner end a roller 78 adapted to engage and ride within a trackway 79 secured to the upright 2.

Figure 4:
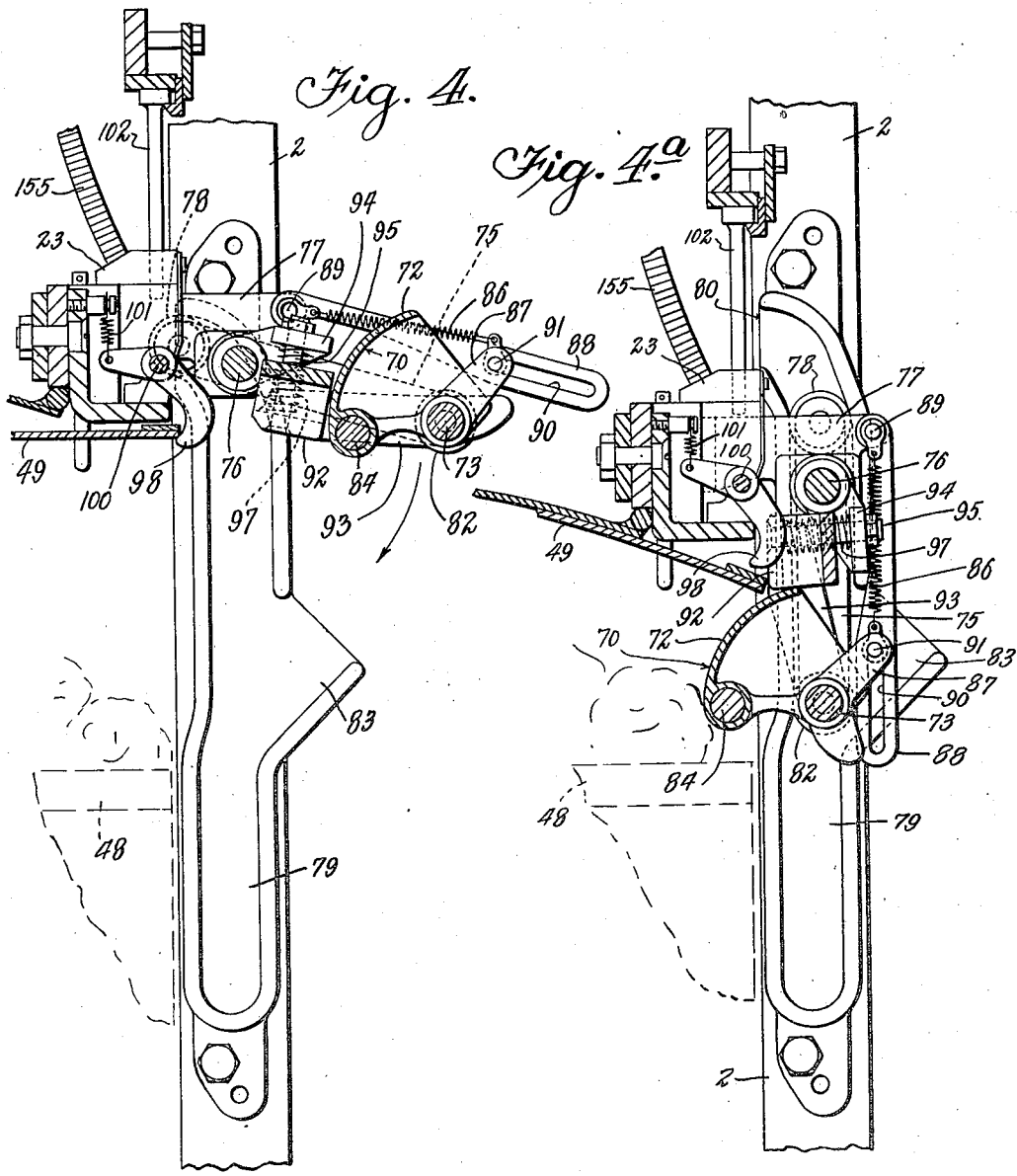
Fig. 4 is a detail view of one of the tucking mechanisms employed with my machine illustrating the tuckers in their extended position prior to the start of the operation of the machine.
Figure 5:
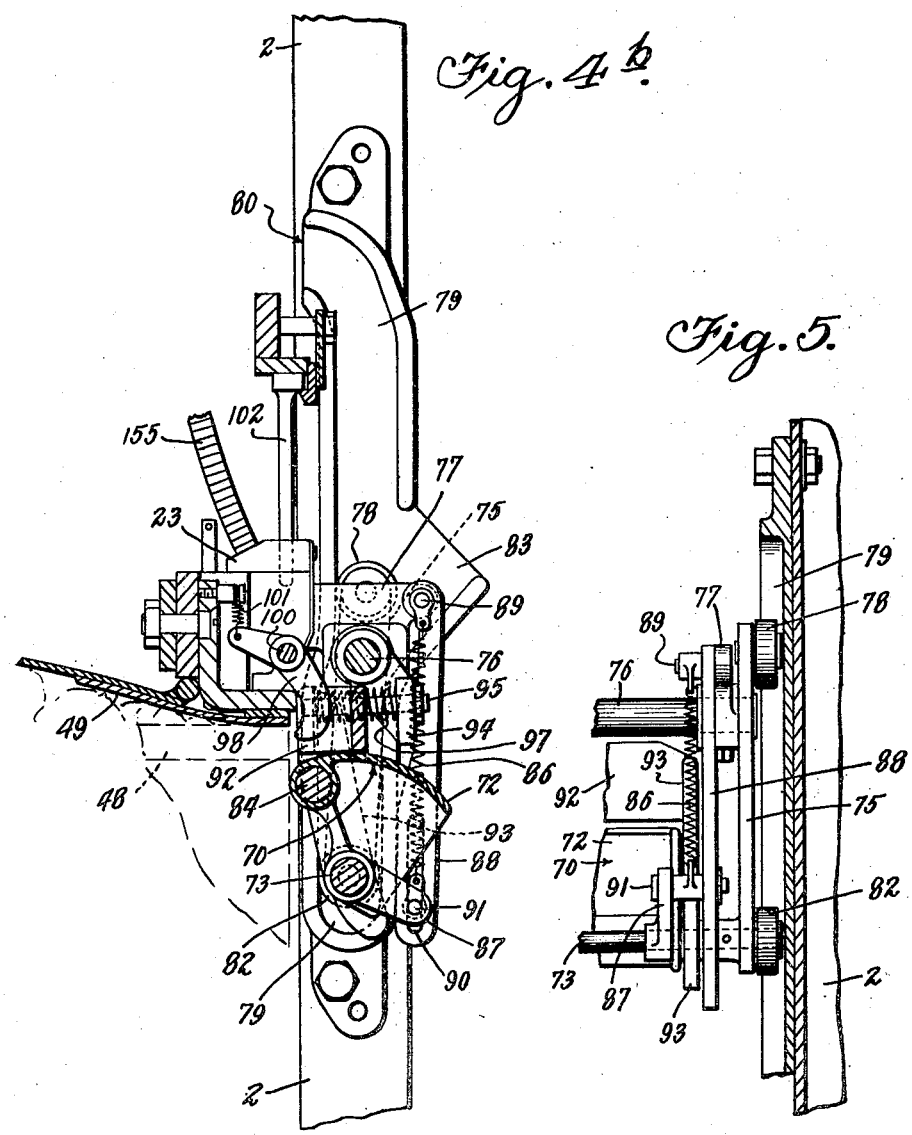
Fig. 5 is a detail view, partly in section, of the tucking mechanism and its controlling mechanism.

By referring particularly to Figures 1, 4, 4a, 4b and 5, it will be observed that the trackway 79 is formed with its upper end extending inwardly toward the center of the machine, as indicated at 80, so that when the pressframe is in its highest elevated position the roller 78 will be engaged by the inwardly extending trackway 79, while as the pressframe is started in its downward movement and draws the tucker 70 and its link 75 downwardly, the roller 78 will be drawn into the trackway 79 and by reason of the shape of the trackway 79 the links 74 and 75 will be moved about the shaft 76 to swing the tucker from a normal position, as shown in Fig. 4, to an inner position as shown in Fig. 4a, this movement being accomplished by the first portion of the downward movement of the pressframe C.

The tuckers will be swung from their elevated position as shown in Fig. 4 to their innermost position as shown in Fig. 4a during that first portion of the downward movement of the press frame necessary to bring the cover down into contact with the protruding contents of the box, the tucker 70 being swung inwardly between the top edge of the box and the extreme end of the cover to engage such contents as may extend outwardly of the end of the box and thereby press this overhanging contents inwardly beyond the inner end of the box where it may be pressed down into the box by the descending cover as the press frame moves to its further downward positions.

The outer end of the link 75 is similarly provided with a roller 82, likewise adapted to enter and ride within the trackway 79. By referring particularly to Figs. 1, 4, 4a, 4b and 5, it will be observed that the trackway 79 has an outwardly extending portion 83 so arranged that when the link 75 is swung downwardly by the engagement of its roller 78 with the rail 80 the roller 82 will be swung into the outwardly extending portion 83 of the track and will thereafter ride downwardly in the trackway 79. Thus as the pressframe C continues its downward movement to press the cover 49 down upon the box, the tucker 70 will press the overflowing contents of the box inwardly of the boundaries of the ends of the box, the pressure exerted by the overflowing contents against the tucker being resisted by the two rollers 78 and 82 engaging the trackway 79.

As the pressframe C continues its downward movement to its lowermost position as indicated in Fig. 4b, the lower edge 84 of the tucker 70 will engage the upper end of the box and will be rotated about its pivot shaft 73 to swing the tucker 70 outside the outer limits of the box to the position shown in Fig. 4b. This movement of the tucker 70 will withdraw the same from its position between the cover 49 and the box 48, permitting the cover 49 to be pressed down into contact with the ends of the box 48 ready to be nailed thereon.

It will be observed that a spring 86, secured to a crankarm 87 attached to or formed integrally with the tucker 70, is employed to normally swing the tucker 70 to the position shown in Fig. 4, but which will yield to permit the tucker to swing to the position shown in Fig. 4b.

In order to swing the tucker 70 out of the way of an incoming box when the pressframe C is in its elevated position, I prefer to provide a link 88 pivoted as at 89 upon the bracket 77, the outer end of the link 88 being provided with an elongated slot 90 engaging a pin 91 in the outer end of the crank 87 so that when the tucker links 74 and 75 are in their most elevated position, (that is swung outwardly with respect to the machine), the inner end of the slot 90 will engage the pin 91 and swing the tucker to the position shown in Fig. 4, but when the link 75 is swung downwardly to the position shown in Fig. 4a, the downward movement of the link 88 will, by reason of the fact that its pivot 89 is offset from the pivot 76, permit the tucker to swing inwardly to the position shown in Fig. 4a.

To insure accurate aligning of the cover 49 with the ends of the box 48, I provide an elongated plate 92 (Fig. 4) extending across the entire length of the tucker 70 to fill the space between the upper surface of the tucker 70 and the bracket 77. In view of the fact that the covers 49 and the boxes 48 may vary considerably in length, it is necessary that the plate 92 be yieldingly mounted, and for this purpose I have illustrated the plate 92 as being connected to a pair of arms 93 which are pivoted upon the shaft 73, so that the plate 92 will swing with the tucker 70 about the axis of shaft 76. The shaft 76, upon which the tucker links are mounted, has rigidly secured thereto a pair of brackets 94 which are connected by means of studs 95 to the plate 92. A spring 97 is interposed between the plate 92 and the bracket 94, normally urging the plate 92 inwardly toward the cover 49 but permitting the plate 92 to yield outwardly against the force of the spring 97 in the event that an extra long cover 49 or crate 48 is encountered during the operation of the machine.

It will also be observed that in order to assist in properly centering the cover 49 in the machine, I provide each of the brackets 77 with a cover-engaging dog 98, these dogs 98 being pivoted as indicated at 100, (see Fig. 4) and normally urged by means of a spring 101 to press the ends of the dogs toward the center of the machine so that when a cover is placed between these dogs, the dogs are maintained in engagement with the cover by brackets 77 the springs 101, holding the cover properly centered between the dogs until the pressframe C moves downwardly to press the cover into contact with the box ends.

The cover having been pressed into place upon the box ends by means of the pressframe C, is now ready to be nailed, and to accomplish this result the nailing cross head D (Fig. 2) is operated to move downwardly to operate the nail punches 102 through their chucks 23 to drive the nails into and through the cover ends and into the box ends. As will be understood by those skilled in the art, the chucks 23 are mounted upon the pressframe C and moved downwardly therewith during the pressing operation, so that during the movement of the pressframe C the nailing cross head D should follow the movement of the pressframe.

To accomplish this result, the nailing cross head D is connected by means of straps 103 (Fig. 1) to a cross bar 104 which is in turn connected through a connecting link 105 to a crankpin 106 (Figs. 8 and 9) mounted upon a crank 107 fixed to a stub shaft 26 which extends through the sleeve 26a in the sector gear 24. On the rear end of the stub shaft 26 (Fig. 9) is fixed a pinion 108 (Figs. 3 and 9) which meshes with an idler pinion 109 rotatably mounted upon a stub shaft 110. The idler 109 is meshed with a drive gear 111 fixed to a sleeve 112 which is in turn rotatable upon the main drive shaft 25. The sleeve 112 (Figs. 3 and 9) carries upon its outer end a friction clutch member 113 arranged to engage a cooperating friction clutch member 114 secured to and rotatable with the drive sprocket 37. The clutch 113—114 is arranged to be operated by means of clutch-operating dogs 115 connected through links 116 to a collar 118 which may be moved rearwardly of the machine by means of a lever 119 pivoted at 120 and having its lower end connected by a pin and slot connection 121 to a slidable bar 122 (Figs. 2 and 3), the forward end of which bar is connected through a rod 123 and a bellcrank 124 the forwardly extending arm of which bears nail-operating foot pedal 125 extending forwardly of the machine. Thus depression of the pedal 125 will cause the link 122 to be moved forwardly, swinging lever 119 about its pivot 120 and pressing the clutch collar 118 rearwardly, actuating the clutch dogs 115 into clutch engaging position.

When the pressing operation has been performed by the pressframe C, the operator of the machine may step upon the pedal 125 to engage the clutch 113—114 to apply power from the motor 38 through the sprocket 37 and gears 111, 109 and 108 to rotate the crank 107 and draw the nail driving cross head D downwardly relative to the pressframe C, thus forcing the nail punches 102 through their chucks 23 and drive the nails through the cover ends into the box ends to secure the cover to the box.

Figure 3:
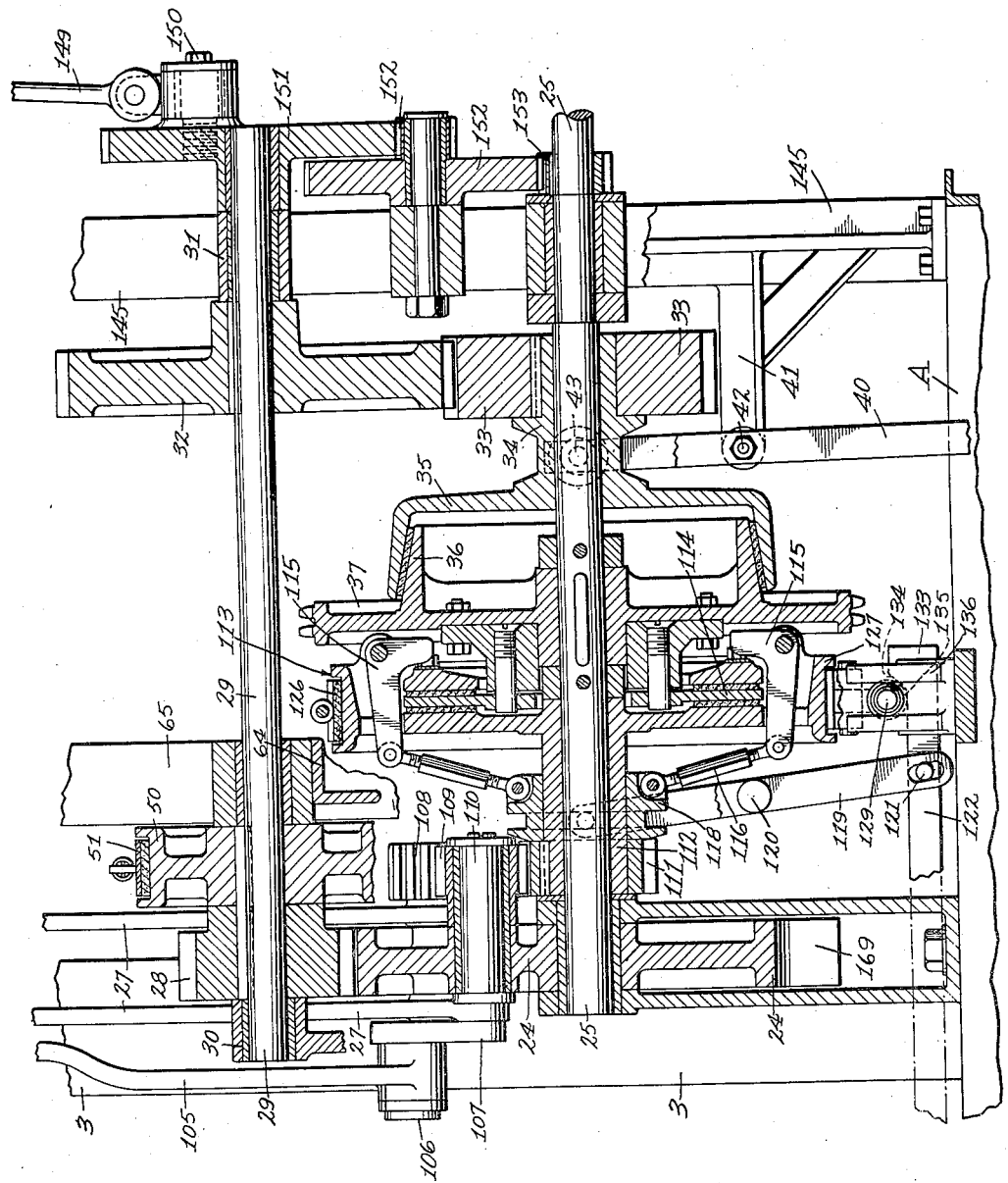
Fig. 3 is a detail sectional view taken along line III—III of Fig. 1, showing the power and control apparatus employed.

It will be observed from an inspection of Figs. 3, 8 and 9 that during the rotation of the sector gear 24 to draw the pressframe C downwardly, the connecting rods 27 for the pressframe C and the connecting rod 105 for the nailing cross head D, will be moved downwardly simultaneously through exactly the same distance so that the two cross heads will move synchronously toward the box without any operative movement between them. During this movement of the sector gear 24, the gear 111 remains stationary and thus movement of the sector gear will, through the gears 109 and 108, rotate the crankpin relative to the sector gear 24 to always maintain the crank 107 in its vertical position independent of the arc through which the sector gear 24 moves. However, when power is applied to rotate the gear 111 resulting from engagement of clutch 114, the crank 107 will be rotated to swing the crankpin 106 through one complete revolution to draw the connecting rod 105 and the cross head D downwardly without further downward movement of the pressframe C.

In order to insure rapid stopping of the sleeve 112 and gears 111—109—108 at the termination of the nailing operation (that is, when the crank 107 has been operated through one complete revolution to first draw the nailing cross head D downwardly and then return the same to its uppermost position as indicated in Fig. 1), I prefer to provide a brake 126 surrounding a brake drum 127 (Figs. 3 and 10) formed upon the exterior of the clutch member 113, this brake being normally urged by means of a spring 128 into engagement with the drum 127. The brake 126 is illustrated as being a band-type brake, one end of which is connected to a pin 129 upon the upper end of a lever 130 pivoted as at 131 upon some stationary portion of the machine, preferably the base A. The opposite end of the brakeband 126 is connected to a pin 132 on the lever 130 at a point spaced inwardly from the end thereof so that by rotating the lever 130 about its pivot 131 to the left, as viewed in Fig. 10, the brakeband 126 will be loosened from its drum 127 and leave the drum free to rotate while the spring 128, urging the lever 130 to the right, will reapply the brakeband 126 to its drum 127 as soon as the lever 130 is released.

In order to insure the release of the brake 126 at the time the clutch members 113—114 are engaged by operation of the nailing pedal 125, I form an extension 133 on the end of the nail-driver pedal bar 122 and form thereon a cam surface 134 engageable with a roller 135 on a lateral extension 136 of the lever 130. Thus as the nail driver pedal bar 122 is moved forwardly to operate the clutch 113—114, the cam 134 will engage the roller 135 and lift the lateral extension 136 and rock the lever 130 to the left, as viewed in Fig. 10, releasing the brake during the time that the clutch 113—114 is engaged. As soon as the nailing operation is complete, the release of the nail-driver pedal 125 by the operator will disengage the clutch 113—114 and will, by reason of the return movement of the bar 122, allow the brakeband 126 to re-engage the drum 127 and stop the nail-driving head in its uppermost position.

As soon as the nail-driving operation is complete, the pressframe C may again be lifted to release the box and permit the same to be ejected from the machine.

In order to accomplish the automatic release of the pressframe C at the end of the nail-driving operation, I provide, upon the clutch member 113, a projection 137 (Fig. 6) which, as the clutch member 113 rotates, will be moved in a path overlapping the extending end 138 of the pressframe brake-operating lever 59. Thus at the end of the rotation of the nail-driving clutch 113—114, the projection 137 will engage the end 138 of the pressframe brake-operating lever 59 to lift the same in exactly the same manner as though the brake-releasing pedal 56 had been operated. This operation will release the brakeband 51 from the brakedrum 50 and allow the springs 69a to relift the pressframe C to its normal position, as indicated in Fig. 1.

To facilitate rapid return of the pressframe C into upper position, special means is provided for accelerating the sector gear 24 in a clockwise direction. This means comprises a lever 200 (Fig. 13) pivotally secured at its lower end to the base A and extending upwardly therefrom into the path of a projection 24a on the sector gear 24. A roller 201 is preferably provided on the upper end of lever 200 for contacting the projection 24a. A spring 202 is connected between the upper end of the lever 200 to the end frame member 10, this spring constantly urging the lever 200 to rotate in a counterclockwise direction about its pivotal attachment to the base. However rotation of the lever in a counterclockwise direction is limited by contact with the lever of a stop 203 on the base A. The projection 24a on the sector gear 24 is so positioned as to contact the roller 201 slightly before the sector gear reaches the end of its movement in a counterclockwise direction so that during the counterclockwise movement of the sector gear, lever 200 is displaced in a clockwise direction about its pivot, as shown in Fig. 13 so that the force exerted by the spring 202 is applied to the projection 24a on the sector gear. When the pressframe is released by release of the brakeband 51 from the brakedrum 50 the force exerted by the spring 202 against the projection 24a aids the springs 69a in starting the return movement of the pressframe.

It will therefore be observed that while the pressing operation may be entirely completed by operation of the foot pedal 47 causing engagement of clutch core 35 (Fig. 3) and that the pressframe may be released at any time by operation of the pressframe brake pedal 56 which releases the brake shown in Fig. 6, the pressframe is automatically released and returned to its uppermost position as a result of the completion of the nailing operation by contact of member 137 in the nail driving clutch 113—114 with end 138 of the press operating lever 59.

As will be understood by those skilled in the art, the machine may be provided with the usual nail-feeding mechanism, comprising a nail pan 139 (Fig. 2) arranged to be oscillated by means of a connecting rod 140, the lower end of which is connected to a lever 141. The lever 141 is illustrated as having its end 142 cut at a considerable angle to engage a similarly angled end of a second lever 143 pivoted at 144 upon the upstanding bearing member 145. The two levers 141 and 143 are connected together by means of idler plates 146, the plate 146 being connected by a pair of bolts or rivets 147 to the lever 141, while a single rivet or bolt 148 connects the plate 146 and the lever 143, constituting thereby a pivot upon which the plate 146 may rotate relative to the lever 143. The outer end of the lever 143 is connected by means of a short link 149 to a crankpin 150 secured to a relatively large spur gear 151 which is in turn driven, through reduction gears 152, by a pinion 153 mounted upon the drive shaft 25.

As will be understood by those skilled in the art, the drive shaft 25 is continuously rotated by means of the member 38 and thus during the entire operation of the motor 38 the nail pan 139 will be oscillated to shake the nails therein into proper feeding arrangement in the nail guides 154, where they may be distributed by means of suitable nail pick apparatus, not shown, into the feed tubes 155 connected with the several nail chucks 23 distributed in the machine.

The connections of the levers 143 and 141 through the agency of the angled surfaces 142 and the plate 146 is such that while the nail pan is given a positive upward movement, there is no positive downward drive for the nail pan. Thus should a person near the machine inadvertently get into the path of movement of the nail pan 139, the nail pan striking such person, would stop this downward movement, though the driving mechanisms for the nail pan would continue their movement without injury to such person.

As hereinbefore described, the operation of the pressing mechanism to operate the pressframe C draws both the pressframe C and the nail driving head D downwardly without changing the distance between the nailing head and the pressframe. Thus, with the nailing table B set as indicated herein, the machine is adapted to apply lids to boxes differing in height by small amounts, such as one or two inches. That is, the sector gear will be rotated until the pressframe C has sprung the ends of the cover down upon a box placed upon the nailing table and will stop as soon as the pressure applied to the box reaches a value equal to or in excess of the adjustable setting of the clutch 35. Thus, the nailing level will depend upon the height of the particular box to be worked upon and, after the cover has been contacted with the box ends, the nail driving mechanism will then be moved by its crank 107 when the clutch is engaged by operation of the pedal 125 to drive the nails at whatever level at which the pressframe C has been stopped. The machine, however, may also be adapted for what is known as "half size boxes", that is, boxes which are approximately only half as deep as the normal box encountered in the machine, by merely arranging the nailing table to be elevated when such half size boxes are to be lidded.

By referring particularly to Figs. 1, 2 and 8, it will be observed that the nailing table B is slidably mounted by reason of the rods 6 and bearings 7 and 8 so that it may move from its normal position, as shown in Figs. 1 and 2, to any position above this level. The nailing table B has a cross bar 156 (Figs. 1, 2 and 13) to which is pivotally connected a link 157, the lower end of the link 157 being connected by means of a pin 158 to a lever 159. The lever 159 is illustrated as being pivoted at 160 to the side frame member 10, while the opposite end of the lever 159 is provided with a shoe 161 extending immediately above a roller 162 mounted upon a crankpin 163 extending from a crank 164. The crank 164 is preferably integrally formed upon a shaft 165 journaled in a bearing 166 mounted upon the base A so that its axis of rotation is in alignment with the axis of shaft 25.

The shaft 165 has a second crank 167 secured thereto, or formed integrally therewith, provided with a removable pin 168 engaging a notch 169 (Figs. 8 and 13) in the outer periphery of the sector gear 24. With the removable pin 168 extending from the crank 167 and into the notch 169, it follows that upon each rotation of the sector gear 24 the crank 167 and its associated crank 164 will swing through an arc equal to the arc of rotation of the sector gear 24.

When the sector gear 24 is thus rotated, the crankpin 163 will be moved upwardly and will carry with it the outer end of the lever 159 raising, by means of the link 157, the nailing table B to a predetermined level. By properly arranging the location of the notch 169 in the sector gear 24 and by properly selecting the length of the crank 164, it will be apparent that upon each operation of the sector gear 24 the nailing table may be moved to the desired level to adapt the machine to apply lids to any given depth of box. By making the pin 168 removable, or, if desired, by making the pin 163 removable, the normal operation of the machine will be as hereinbefore described without lifting of the nailing table B while, when the operator sees that a box of lesser height is to be lidded, he may insert the pin in the appropriate crank and the next operation of the sector gear 24 will appropriately lift the nailing table B.

In order to insure that the box 48 is properly centered in the machine so that the cover will be pressed accurately in alignment with the ends of the box, I provide a pair of box-stopping mechanisms, one of which is indicated by the reference character 170 and the other by the reference character 171 (Figs. 1 and 13). The box stop 171 is preferably a plate pivoted at 172 upon an upstanding bracket 173 secured to the base of the nailing table B, the plate 171 having a tailpiece 174 (Fig. 2) engaged by a spring-actuated bolt 175 so as to normally swing the plate into the position shown in Fig. 1 and which, as the box is fed in from the right-hand side of the machine, as viewed in Fig. 1, will be depressed by contact with the box until the box has moved completely beyond the plate 171, whereupon the plate 171 will be sprung upwardly by its spring 175 to engage the right-hand end of the box.

The box stop 170 must be arranged to be interposed in the path of the incoming box and must hold the box against movement completely through the machine up to the end of the cycle of operations for applying the lid to the box, but then such box stop must be capable of being removed from the path of the box to allow the box to pass out through the left-hand end of the machine. For this purpose I have illustrated the box stop 170 (Figs. 1 and 12) as comprising rollers 176 (Fig. 2) mounted upon a shaft pin 177 (Fig. 12) extending through the upper end of a short lever 178. The lever 178 is pivoted as at 179 to a support 180 which is, in turn, rotatably mounted upon a shaft 181 which preferably constitutes the shaft rotatably supporting the left-hand end roller 18 of the nailing table B. The support 180 is provided with a downwardly extending tailpiece 182 normally arranged to abut the end of a blocking member 183 so that when a box is moved into the machine and strikes the roller 176, movement of the box will be opposed by the engagement of the tailpiece 182 with the blocking member 183.

The blocking member 183 is rigidly secured to a shaft 184 (Fig. 11) which extends rearwardly through the nailing table B and carries upon its rearward end a crank 185 having a roller 186 thereon while the forward end of the shaft 184 extends through the front of the nailing table and is preferably bent angularly to form an operating handle 187 by which the shaft 184 may be rotated in a counterclockwise direction. A spring 188 is interposed between the blocking member 183 and some stationary portion of the nailing table frame and normally holds the shaft 184 and the blocking member 183 in the position shown in Fig. 12, against a stop 188', so that normally the blocking member 183 is interposed in the path of movement of the tailpiece 182.

With the parts in the positions indicated in Fig. 12, the incoming box will strike the roller 176 and will be prevented from moving further through the machine. The nailing head D has a cam 189 (Figs. 1, 11 and 12) secured thereto (preferably to the cross strap 104) and movable therewith so that as the nailing head D performs the nailing operations the cam 189 will be moved downwardly into the path of the roller 186 on the shaft 184 and will cause this roller to be moved in a counterclockwise direction. When this movement of the roller 186 and shaft 184 occurs, the blocking member 183 will be moved out of engagement with the tailpiece 182 and the support 180 may be swung about its pivot pin 181 allowing the roller 176 to move to the position shown in Fig. 12a, permitting the box to move outwardly of the machine.

It will be observed that the release of the support 181 occurs during the downward movement of the nailing head D, at which time, however, the pressure exerted by the pressframe C and the nailing mechanism will not permit the box to then move. In order to prevent the blocking member 183 from reengaging the end of the tailpiece 182, the tailpiece 182 is provided with a separate section 191 normally located in the position shown in Fig. 12, but movable by means of its spring 192 to the position shown in dotted lines at 193. Thus when the blocking member 183 is once moved downwardly relative to the tailpiece 182, the separate section 191 of the tailpiece will swing outwardly to engage the top of the blocking member 183 and prevent the blocking member from returning to its normal position abutting the side of the tailpiece 182.

Thus when the nailing head D and pressframe C are lifted from the box, the box is free to move out of the machine and the box stop 170 is held in lowered position so that this movement of the box may occur. However, as soon as the box has passed beyond the box stop 170, a spring 194 will swing the support 180 in a clockwise direction, to a position against the crossrail 191' of the nailing table B, realigning the side edge of the tailpiece 182 with the end of the blocking member 183, and permitting the blocking member 183 to assume its normal position, as shown in Fig. 12, thus relatching the box stop for the next box to be fed into the machine.

However, if for any reason it is desired to release the box prior to the actuation of the pressing and nailing operations, the handle 187 on the shaft 184 may be rotated to move the blocking member 183 out of engagement with the support 180 in the same manner as though the shaft 184 had been operated by the cam 189.

Reviewing the operation of my machine, the start of a cycle of operations for the lidding and nailing of a box requires that the pressframe and nailing head shall be in their elevated position as shown in Figs. 1 and 2 and all of the parts of the machine will at this time be in the positions illustrated in these figures. The operator of the machine then draws a box 48 into the machine by moving the same longitudinally over the rollers 18 of the nailing table B until the advancing end of the box engages the stop 170. At this time the opposite end of the box will be in a position to just permit the rear box stop 171 to move upwardly behind the end of the box. Thus by engaging both ends of the box with the box stops 170 and 171, the box will be properly centered under the pressing mechanism and the nailing head.

The operator then steps upon pedal 47, engaging clutch elements 35 and 37, causing the motor 38 to drive the sector gear 24 through a partial revolution, drawing the pressframe downwardly by means of the linkage 27. At the same time the rotation of the sector gear will draw the nailing head D downwardly through the agency of the links 105 and 103, until the pressframe engages the cover 49 and presses the same down toward the extending contents rising above the side walls of the box. During this initial downward movement the tuckers 70 and 71 will be swung inwardly to project themselves between the extreme ends of the cover and the upper edges of the end walls of the box to press protruding contents at the ends of the box inwardly thereof. As the sector gear 24 continues to rotate, the pressframe will press the ends of the cover downwardly toward the ends of the box, the tuckers 70 and 71 engaging the upper edges of the ends of the box and being rotated outwardly of the box by such engagement. When the cover ends are brought into contact with the box ends, the pressframe cannot move to a further downward position, the clutch 35, 37 slipping as soon as the desired pressure for which this clutch has been adjusted is reached. Likewise there is no further downward movement of the nailing head D under the influence of movement of the sector gear 24 so that irrespective of the height of a box the nailing head and the pressframe are brought downwardly in synchronism with each other until the pressframe is stopped by its pressure on the box.

The operator will then release the pedal 47, the brake 51 acting to prevent return movement of the sector gear and thus holding the pressframe in pressure relation with the cover of the box.

If during this downward movement of the pressframe it is discovered that the fruit or the cover or the box is likely to be injured, the operator may stop the movement at any point by release of the pedal 47 and if he finds that it is necessary to rearrange the contents of the box or to rearrange or replace the cover, he may permit the nailing head and the pressframe to ascend by operating the release pedal 56 which releases the brake, permitting the springs 69a to raise the pressframe and nailing head.

If, however, it appears that the cover, the box and the contents are in proper arrangement to complete the nailing operation, the operator may then step upon the pedal 125, causing engagement of the clutch 113, 114, which will cause the motor to drive the crankpin 107 through one complete rotation, pulling the nailing head D downwardly through the agency of the links 105 and 103. This movement of the nailing head downwardly will occur at a time when the pressframe C is held stationary in contact with the cover of the box and the nail punches 102 will be pressed downwardly through the chucks to drive the nails through the cover ends and into the box ends.

When the nailing head D arrives at its lowermost position, the brake 51, which has been up to this time holding the pressframe downwardly, will be released by the projecting finger 137 engaging the brake operating lever 138 and the pressframe will be allowed to ascend under the influence of the springs 69a, the elevation of the pressframe moving the sector gear 24 back to its normal position.

The initial acceleration of the pressframe into upward position is aided by the spring 202 acting through the lever 200 and the roller 201 on the projection 24a on the sector gear 24.

During the final downward movement of the nailing head D the cam 189 intercepted the roller 186 on the shaft 184 thereby disengaging the blocking member 183 from the tailpiece 182 and the separate section 191 thereon. The tailpiece 182 remained in the same position despite its release by the blocking member 183 but the separate section 191 was then shifted by the spring 192 in position to prevent the return of the blocking member 183 following the return of the cam 189 at the completion of the cycle described. Therefore at the completion of the cycle described, the box 48 can be moved to the left out of the machine by virtue of the fact that the stop member 170 is restrained from rotation in a counterclockwise direction only by the resilient force exerted by the spring 194 and the spring readily yields to permit the stop 170 to drop below the path of the box as shown in Fig. 12a. However, following complete removal of the box from above the stop 170 the latter is restored to normal position by the spring 194 and the blocking member 183 again engages the tailpiece 182 and the separate section 191, as shown in Fig. 12, to hold the stop member 170 in raised position to stop the next box.

The operation has been described for nailing lids on full size boxes under which condition the pin 168 will be removed from the crank 167 so that the nailing table B remains in normal lowermost position throughout the cycle. However, if it is desired to use the machine with boxes of substantially less height than the machine is normally adapted to handle, then the pin 168 is inserted in the crank 167 and into the notch 169 in the sector gear 24 so that the crank 167, the shaft 165 and the crank 164 is swung through an arc equal to the arc of rotation of the sector gear 24 during each movement of the latter. Therefore when the sector gear 24 rotates in a counterclockwise direction during the cycle of operation as previously described, the crank 164 is rotated to carry the roller 162 against the lever 159 thereby swinging the latter upwardly about its pivoted left end and raising the nailing table B to a higher level with respect to the pressframe for compensating for the reduced height of the lower box. Of course after the lid has been attached to the box in the manner previously described, the return of the sector gear 24 lowers the lever 159 and the nailing table B to lowermost bottom position, ready to discharge the nailed box and receive a new box.

While I have shown and described the preferred embodiment of my invention, I do not desire to be limited to any of the details of construction shown herein, except as defined in the appended claims.

I claim:

1. In a machine for applying lids to boxes, a nailing table for supporting a box in position to receive a lid, a pressframe, means mounting said pressframe for movement toward and away from said nailing table, a nailing head, means mounting said nailing head for movement toward and away from said nailing table, and means for moving said pressframe and said nailing head simultaneously toward said nailing table to press a cover upon a box, and additional means for separately moving said nailing head relative to said pressframe for nailing a cover to the box.

2. In a machine for applying lids to boxes, a nailing table for supporting a box in position to receive a lid, a pressframe, means mounting said pressframe for movement toward and away from said nailing table, a nailing head, means mounting said nailing head for movement toward and away from said nailing table, means for moving said pressframe and said nailing head, including means for simultaneously moving said pressframe and said nailing head as a unit toward said nailing table, to press a cover upon a box, and additional means for then moving said nailing head relative to said pressframe to perform the nailing operations.

3. In a machine for applying lids to boxes, a pressframe for pressing a cover down upon a box, tucking means carried by said pressframe for engaging overflowing contents of said box and pressing the same inwardly of the box prior to the pressing of the cover into contact with the box, said tucking means comprising a tucker member and means including a link for oscillatively mounting said tucker member on said pressframe, cam follower means on said link, and cam means stationarily mounted for engaging said follower means to swing said link toward a box upon the initial movement of said pressframe toward said box and to maintain said link near the box during the remainder of the movement of said pressframe toward said box.

4. In a machine for applying lids to boxes, a nailing table for supporting a box, lid pressing and nailing means mounted for movement toward and away from said nailing table, a box-stop on said nailing table for engaging a box to align the same in a predetermined position on said nailing table, said box stop including means engageable by the end of a box, means rotatably mounting said box engaging means for movement in the direction of movement of said box, blocking means normally engaging said box stop to prevent movement thereof, and means operably responsive to movement of said nailing mechanism for moving said blocking means out of engagement with said box stop.

5. In a machine for applying lids to boxes, a nailing table for supporting a box, lid pressing and nailing means mounted for movement toward and away from said nailing table, a box stop on said nailing table for engaging a box to align the same in a predetermined position on said nailing table, said box stop including means engageable by the end of a box, means rotatably mounting said box engaging means for movement in the direction of movement of said box, blocking means normally engaging said box stop to prevent movement thereof, means operably responsive to movement of said nailing mechanism for moving said blocking means out of engagement with said box stop, and means on said box stop for preventing re-engagement of said blocking means and said box stop until a box has passed away from said box stop.

6. A machine as described in claim 3, in which said tucker member has a tucking surface and is rotatably mounted upon said link for rotation about an axis spaced from said tucking surface, and means for rotating said tucker member relative to said link in response to swinging movement of said link toward said box whereby said tucking surface is retained in substantially the same position relative to the axis of movement of the tucker member during swinging movement of said link.

7. In a machine for applying covers to boxes, a frame, a nailing table on said frame for supporting a box while a cover is attached thereto, lidding, pressing and nailing mechanism mounted on said frame for movement toward and away from said nailing table, spring means for urging said mechanism away from said table, means for moving said mechanism toward said table comprising a rotatable member having a crank thereon, a connecting rod connecting said crank to said mechanism for drawing said mechanism toward said table in response to rotation of said rotatable member through approximately one-half revolution, and auxiliary spring means coupled to said rotatable member independently of said lidding, pressing and nailing mechanism for yieldingly resisting rotation of said member through the last portion of its cycle of movement, power means, means for releasably coupling said power means to said rotatable member for rotating the latter in a direction to move the mechanism toward said table, whereby engagement of said coupling means causes said power means to rotate said member and move said mechanism against the force exerted by said spring means and auxiliary spring means, and said spring means and auxiliary spring means restore said rotatable member and mechanism to normal position in response to release of said coupling means.

8. In a machine for applying lids to boxes, a press frame for pressing a cover down upon a box, tucking means carried by said press frame for engaging overflowing contents of said box and pressing the same inwardly of the box prior to the pressing of the cover into contact with the box, said tucking means comprising a tucker member, a link mounting said tucker member on said press frame, said link being oscillatively supported on said press frame, a first cam follower on said link and a first cam stationarily mounted for engaging said first follower to swing said link toward a box upon the initial movement of the press frame toward the box, a second cam follower on the link and a second cam for engaging said second follower to maintain said link near the box during the remainder of the movement of said press frame toward said box.

9. In a machine for applying lids to boxes, a press frame for pressing a cover down upon a box, tucking means carried by said press frame for engaging overflowing contents of said box and pressing the same inwardly of the box prior to the pressing of the cover into contact with the box, said tucking means comprising a tucker member, a link mounting said tucker member on said press frame, said link being oscillatively mounted on said press frame, a first cam follower on said link and a first cam stationarily mounted for engaging said first follower to swing said link toward a box upon the initial movement of the press frame toward the box, a second cam follower on the link and a second cam for engaging said second follower to maintain said link near the box during the remainder of the movement of said press frame toward said box, said second follower being moved into position to engage said second cam in response to movement of said link by said first cam and follower.

10. A machine as described in claim 9 in which said second follower is spaced a substantially greater distance from the center of oscillation of said link than said first follower is spaced from said fulcrum.

11. In a machine for applying lids to boxes, a press frame for pressing a cover down upon a box, tucking means carried by said press frame for engaging overflowing contents of said box and pressing the same inwardly of the box prior to the pressing of the cover into contact with the box, said tucking means comprising a tucker member, a link mounting said tucker member on said press frame, cam follower means on said link and cam means stationarily mounted for engaging said follower means to swing said link toward a box upon the initial movement of said press frame toward said box and to maintain said link near the box during the remainder of the movement of said press frame toward said box, and a lid aligning element on said link for engaging the end of a lid and aligning the lid with the box in response to movement of said link toward the box.

12. A machine as described in claim 11, with spring means for yieldably supporting said aligning element on said link.

13. A machine as described in claim 3, in which said tucker member has a tucking surface and is rotatably mounted upon said link for rotation about an axis spaced from said tucking surface, means for rotating said tucker member relative to said link in response to swinging movement of said link toward said box whereby said tucking surface is retained in substantially the same position relative to the axis of movement of the tucker member during swinging movement of said link, said tucker rotating means including a second link pivotally attached to said press frame, guide means extending longitudinally of said second link, a crank on said tucker member, and means coupling said crank to said guide means for longitudinal movement therealong, stop means at one end of said guide means, spring means urging said coupling means against said stop means, said tucker member contacting the edge of a box and rotating out of the path of the box against the force of said spring means in response to final downward movement of said press frame.

14. In a machine for applying covers to boxes of variable height, a frame, a box support movable vertically on said frame, a lidding mechanism movable vertically through a substantially fixed distance on said frame above said box support for attaching a lid to a box on the box support, means for lifting said box support to elevate boxes into lidding relation with said lidding mechanism, and means for actuating said lifting means and moving said lidding mechanism downwardly through said substantially fixed distance, and means for predetermining the distance the boxes will be lifted.

15. In a nailing machine for nailing work pieces of variable height, a frame, a support movable vertically on said frame for supporting a work piece to be nailed, a nailing mechanism movable vertically through a substantially fixed distance above said support for nailing a work piece thereon, means for lifting said support to elevate work pieces into nailing relation with said nailing mechanism, and means for actuating said lifting means and moving said nailing mechanism downwardly through said fixed distance, and means for predetermining the distance the boxes will be lifted.

16. In a nailing machine, a nailing table for supporting a work piece, a nail chuck, means mounting said nail chuck for movement toward and away from said nailing table, a nail driver, means mounting said nail driver for movement toward and away from said nailing table, means for moving said nail chuck and said nail driver, including means for simultaneously moving said nail chuck and said nail driver as a unit toward said nailing table to engage said nail chuck against a work piece on said nailing table, and additional means for then moving said nail driver relative to said nail chuck to perform the nailing operation.

17. In a nailing machine, a nailing table for supporting a work piece to be nailed, a nail chuck, means mounting said nail chuck for movement toward and away from said nailing table, a nail driver, means mounting said nail driver for movement toward and away from said nailing table, means for moving said nail chuck and said nail driver toward said nailing table, including rotatable means, a crank mounted for rotation about an axis fixed relative to said rotatable means and spaced from the axis of rotation of said rotatable means, means connecting the nail chuck to the rotatable means at the axis of rotation of said crank, means connecting the outer end of said crank to said nail driver, means for selectively rotating said rotatable means, and means for selectively rotating said crank independently of said rotating means.

18. In a nailing machine, a nailing table for supporting a work piece to be nailed, a nail chuck, means mounting said nail chuck for movement toward and away from said nailing table, a nail driver, means mounting said nail driver for movement toward and away from said nailing table, means for moving said nail chuck and said nail driver toward said nailing table, including rotatable means, a crank mounted for rotation about an axis fixed relative to said rotatable means and spaced from the axis of rotation of said rotatable means, means connecting the nail chuck to the rotatable means at the axis of rotation of said crank, means connecting the outer end of said crank to said nail driver, means for selectively rotating said rotatable means, means for selectively rotating said crank independently of said rotating means, brake means for holding said rotatable means in the position to which it is moved, and means operably responsive to the rotation of said crank for releasing said brake.

19. In a nailing machine, a nailing table for supporting a work piece to be nailed, a nail chuck, means mounting said nail chuck for movement toward and away from said nailing table, a nail driver, means mounting said nail driver for movement toward and away from said nailing table, means for moving said nail chuck and said nail driver toward said nailing table, including rotatable means, a crank mounted for rotation about an axis fixed relative to said rotatable means and spaced from the axis of rotation of said rotatable means, means connecting the nail chuck to the rotatable means at the axis of rotation of said crank, means connecting the outer end of said crank to said nail driver, means for selectively rotating said rotatable means, means for selectively rotating said crank independently of said rotating means, brake means for holding said rotatable means in the position to which it is moved, means operably responsive to the rotation of said crank for releasing said brake, and manual means independent of said crank operating means for manually releasing said brake.

20. In a nailing machine, a nailing table for supporting a work piece to be nailed, a nail chuck, means mounting said nail chuck for movement toward and away from said nailing table, a nail driver, means mounting said nail driver for movement toward and away from said nailing table, means for moving said nail chuck and said nail driver toward said nailing table, including rotatable means, a crank mounted for rotation about an axis fixed relative to said rotatable means and spaced from the axis of rotation of said rotatable means, means connecting the nail chuck to the rotatable means at the axis of rotation of said crank, means connecting the outer end of said crank to said nail driver, means for selectively rotating said rotatable means, means for selectively rotating said crank independently of said rotating means, brake means for holding said rotatable means in the position to which it is moved, means operably responsive to rotation of said crank for releasing said brake, manual means independent of said crank operating means for manually releasing said brake, and means normally urging said nail chuck away from said nailing table.

21. In a nailing machine, a nailing table for supporting a work piece to be nailed, a nail chuck, means mounting said nail chuck for movement toward and away from said nailing table, a nail driver, means mounting said nail driver for movement toward and away from said nailing table, means for moving said nail chuck and said nail driver toward said nailing table, including rotatable means, a crank mounted for rotation about an axis fixed relative to said rotatable means and spaced from the axis of rotation of said rotatable means, means connecting the nail chuck to the rotatable means at the axis of rotation of said crank, means connecting the outer end of said crank to said nail driver, means for selectively rotating said rotatable means, means for rotating said crank with respect to said rotatable means in a reverse direction to the direction of rotation of said rotatable means in response to rotation of the latter, and means for selectively rotating said crank independently of said rotating means.

22. In a nailing machine, a nailing table for supporting a work piece to be nailed, a nail chuck, means mounting said nail chuck for movement toward and away from said nailing table, a nail driver, means mounting said nail driver for movement toward and away from said nailing table, means for moving said nail chuck and said nail driver toward said nailing table, including rotatable means, a crank mounted for rotation about an axis fixed relative to said rotatable means and spaced from the axis of rotation of said rotatable means, means connecting the nail chuck to the rotatable means at the axis of rotation of said crank, means connecting the outer end of said crank to said nail driver, means for selectively rotating said rotatable means, a second rotatable means coaxial with said first rotatable means, means coupling said second rotatable means to said crank for forcing them to rotate in unison in the same direction, each about its own axis, means for selectively restraining rotation of said second rotatable means, and means for selectively rotating said second rotatable means.

23. In a nailing machine, a nailing table for supporting a work piece to be nailed, a nail chuck, means mounting said nail chuck for movement toward and away from said nailing table, a nail driver, means mounting said nail driver for movement toward and away from said nailing table, means for moving said nail chuck and said nail driver toward said nailing table, including rotatable means, a crank mounted for rotation about an axis fixed relative to said rotatable means and spaced from the axis of rotation of said rotatable means, means connecting the nail chuck to the rotatable means at the axis of rotation of said crank, means connecting the outer end of said crank to said nail driver, means for selectively rotating said rotatable means, a second rotatable means coaxial with said first rotatable means, means coupling said second rotatable means to said crank for forcing them to rotate in unison in the same direction, each about its own axis, means for normally restraining rotation of said second rotatable means, and means for releasing said restraining means and simultaneously rotating said second rotatable means.

HERBERT E. TWOMLEY.